(12) United States Patent
Keohane et al.

(10) Patent No.: US 10,957,132 B2
(45) Date of Patent: Mar. 23, 2021

(54) AUTHENTICATING ACCESS TO A PHYSICAL SPACE

(71) Applicant: International Business Machines Corporation, Armonk, NY (US)

(72) Inventors: Susann M. Keohane, Austin, TX (US); Cristi N. Ullmann, Austin, TX (US); Karthik Pallapothu, Evanston, IL (US); Tiffany Cross, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/188,593

(22) Filed: Nov. 13, 2018

(65) Prior Publication Data
US 2020/0151976 A1    May 14, 2020

(51) Int. Cl.
*G07C 9/00* (2020.01)
*G10L 15/18* (2013.01)
(Continued)

(52) U.S. Cl.
CPC .......... *G07C 9/00182* (2013.01); *G10L 15/18* (2013.01); *G10L 15/22* (2013.01);
(Continued)

(58) Field of Classification Search
CPC ............... G06F 21/6218; G06F 3/0482; G06F 3/04847; G06F 3/0488; G06F 3/1423; G06F 11/321; G06F 11/3466; G06F 11/3664; G06F 11/3688; G06F 8/38; G06F 9/44521; G06Q 20/202; G06Q 30/06; H04L 41/0806; H04L 41/0816; H04L 41/12; H04L 43/10; H04L 67/141; H04L 67/18; H04L 67/22; H04L 67/303; H04L 67/12; H04L 67/125; H04L 12/2803; H04L 12/2818; H04L 12/2825; H04L 12/2829;
(Continued)

(56) References Cited

U.S. PATENT DOCUMENTS 8,375,118 B2    2/2013    Hao et al.
8,650,311 B2    2/2014    Dattagupta et al.
(Continued)

OTHER PUBLICATIONS

Ziegler et al., "Secure Profile Management in Smart Home Networks," Paderborn University / C-LAB, Fuerstenallee 11, 33102 Paderborn, Germany, 5 pgs.

*Primary Examiner* — Dionne Pendleton
(74) *Attorney, Agent, or Firm* — Cantor Colburn LLP; Brian Welle

(57) ABSTRACT

According to one or more embodiments described herein, a computer-implemented method includes detecting a trigger event occurring at a physical space. The method further includes generating, by the processing system, a temporary network and a temporary authorization code to permit access to the physical space based at least in part on an analysis of information associated with the detected trigger event. The method further includes transmitting, by the processing system, information about the temporary network and the temporary authorization code to a second processing system. The method further includes implementing, by the processing system, an automation routine responsive to detecting the trigger event.

15 Claims, 7 Drawing Sheets

(51) Int. Cl.
  *G10L 15/22* (2006.01)
  *H04W 4/90* (2018.01)
  *H04L 29/06* (2006.01)
  *H04W 12/08* (2021.01)
  *G10L 15/08* (2006.01)

(52) U.S. Cl.
  CPC .......... *H04L 63/107* (2013.01); *H04L 63/108* (2013.01); *H04W 4/90* (2018.02); *H04W 12/0804* (2019.01); *G07C 2009/00246* (2013.01); *G10L 2015/088* (2013.01); *G10L 2015/223* (2013.01)

(58) Field of Classification Search
  CPC . H04L 12/4625; H04L 12/6418; H04L 67/10; H04L 67/2823; H04L 63/0853; H04L 63/0876; H04L 63/068; H04L 63/101; H04W 12/08; H04W 4/029; H04W 4/90; H04W 60/00; H04W 64/00; H04W 76/50; H04W 4/023; H04W 4/027; H04W 4/33; H04W 4/38; H04W 4/40; H04W 4/70; H04W 4/80; H04W 84/18; H04W 4/00; H04W 12/00405; H04W 12/06; H04W 36/14; H04W 8/183; H04W 8/20; H04W 12/0804; H04W 63/107; H04W 12/003; H04W 12/04031; H04W 84/12; H04W 12/0017; H04W 12/009; H04W 12/0401; H04W 16/02; H04W 28/16; H04W 48/16; H04W 76/10; H04W 76/14; H04W 80/04; H04W 88/04; H04W 88/06; H04W 8/005; H04W 8/04; H04W 8/06; H04W 8/065; H04W 8/12; H04W 8/26; H04M 3/00; H04M 3/5116; H04M 15/77; H04M 15/771; H05B 47/10; H05B 47/105; H05B 47/175; G05B 15/02; G05B 2219/2642; G05B 19/042; G05B 11/01; G05B 2219/2613; C08L 1/00; G06N 20/00; G06N 5/025; G06N 5/04; G08B 15/002; G08B 19/00; G08B 25/008; G08B 27/003; Y02D 30/70; G10L 2015/223; G10L 15/18; G10L 15/1822; G10L 15/22; G10L 2015/088; G07C 2009/00246; G07C 9/00; G07C 9/00182; Y04S 40/18

See application file for complete search history.

(56) References Cited

U.S. PATENT DOCUMENTS

| | | | |
|---|---|---|---|
| 8,988,232 B1 | 3/2015 | Sloo et al. | |
| 9,483,735 B2 | 11/2016 | Chen et al. | |
| 9,497,585 B1* | 11/2016 | Cooley | H04L 67/22 |
| 10,104,710 B1* | 10/2018 | Hodge | H04W 76/15 |
| 2012/0108206 A1* | 5/2012 | Haggerty | H04W 8/20 |
| | | | 455/411 |
| 2013/0173062 A1 | 7/2013 | Koenig-Richardson | |
| 2014/0266669 A1* | 9/2014 | Fadell | G05B 19/042 |
| | | | 340/501 |
| 2015/0156030 A1 | 6/2015 | Fadell et al. | |
| 2016/0055469 A1* | 2/2016 | Kim | H04L 41/12 |
| | | | 705/21 |
| 2016/0259308 A1 | 9/2016 | Fadell et al. | |
| 2017/0103628 A1 | 4/2017 | Lampert et al. | |
| 2019/0179736 A1* | 6/2019 | Sharma | G06F 9/44521 |
| 2019/0187643 A1* | 6/2019 | Carpenter | H04L 67/125 |
| 2020/0051189 A1* | 2/2020 | Williams | H04L 67/12 |
| 2020/0100171 A1* | 3/2020 | Uchikawa | H04W 8/005 |

\* cited by examiner

AUTHENTICATING ACCESS TO A PHYSICAL SPACE

BACKGROUND

The present invention generally relates to processing systems, and more specifically, to authenticating access to a physical space.

Physical spaces are often restricted using premise security devices, such as locks. Access to a physical space may be controlled by the premise security device such that only one with an authorized key or access code can enter. Premise security devices can be electronic and/or enabled with "smart" capabilities. For example, a "smart lock" is a type of premise security device that aids in securing a physical space, such as by locking a door, window, etc. The smart lock can be controlled using a passcode, which can be entered directly to the smart lock or using an application executing on a user device. The smart lock can also be controlled, for example, by detecting the presence of an authorized user device. That is, when an authorized user device (i.e., a device associated with a user who is authorized to access a physical space associated with the smart lock) comes within a certain proximity (e.g., within wireless communication range, within a predefined distance, etc.), the smart lock can change states to permit or deny access accordingly.

SUMMARY

Embodiments of the present invention are directed to a computer-implemented method for authenticating access to a physical space. A non-limiting example of the computer-implemented method includes detecting a trigger event occurring at a physical space. The method further includes generating, by the processing system, a temporary network and a temporary authorization code to permit access to the physical space based at least in part on an analysis of information associated with the detected trigger event. The method further includes transmitting, by the processing system, information about the temporary network and the temporary authorization code to a second processing system. The method further includes implementing, by the processing system, an automation routine responsive to detecting the trigger event.

Embodiments of the present invention are directed to a system. A non-limiting example of the system includes a memory comprising computer readable instructions and a processing device for executing the computer readable instructions for performing a method for authenticating access to a physical space.

Embodiments of the invention are directed to a computer program product. A non-limiting example of the computer program product includes a computer readable storage medium having program instructions embodied therewith. The program instructions are executable by a processor to cause the processor to perform a method for authenticating access to a physical space.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
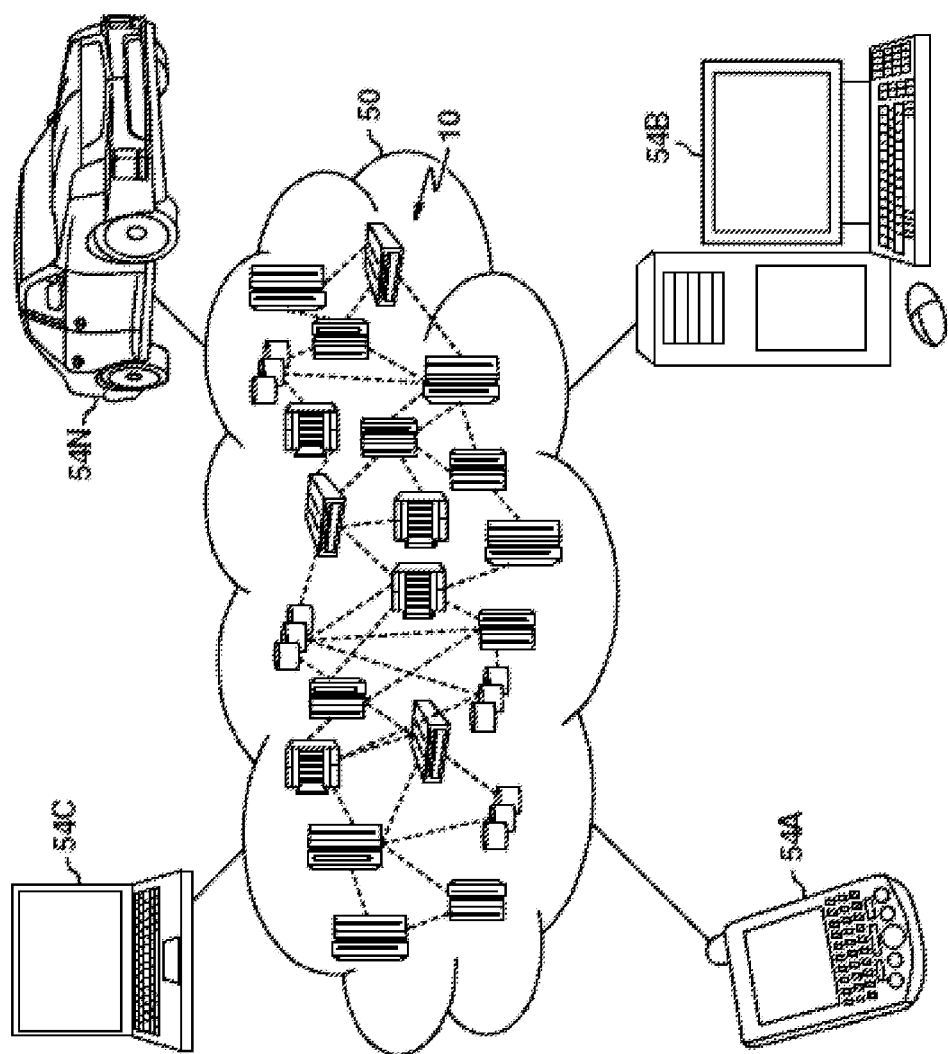
FIG. 1 depicts a cloud computing environment according to one or more embodiments described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection".

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
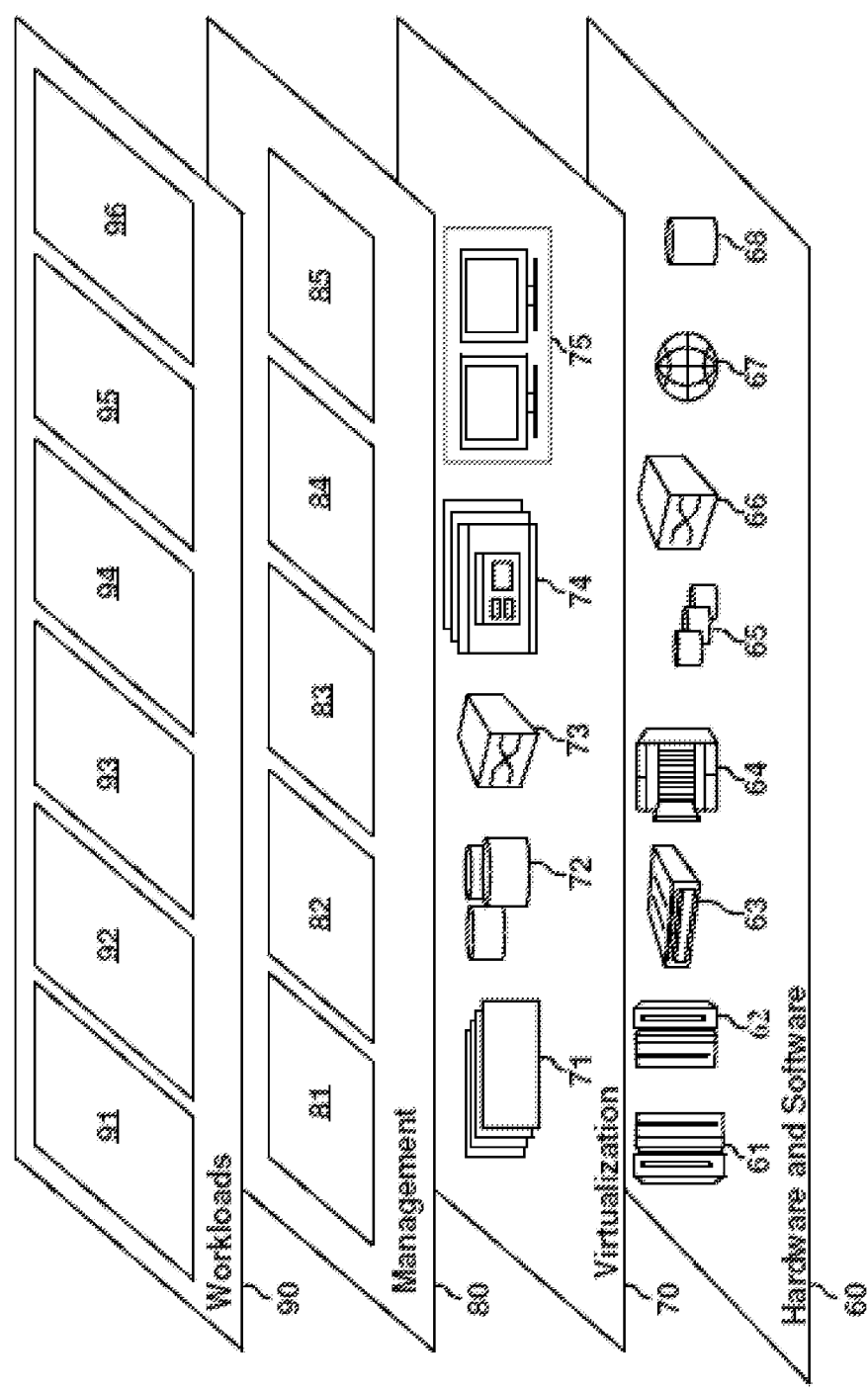
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authenticating entry to a physical space 96.

Figure 3:
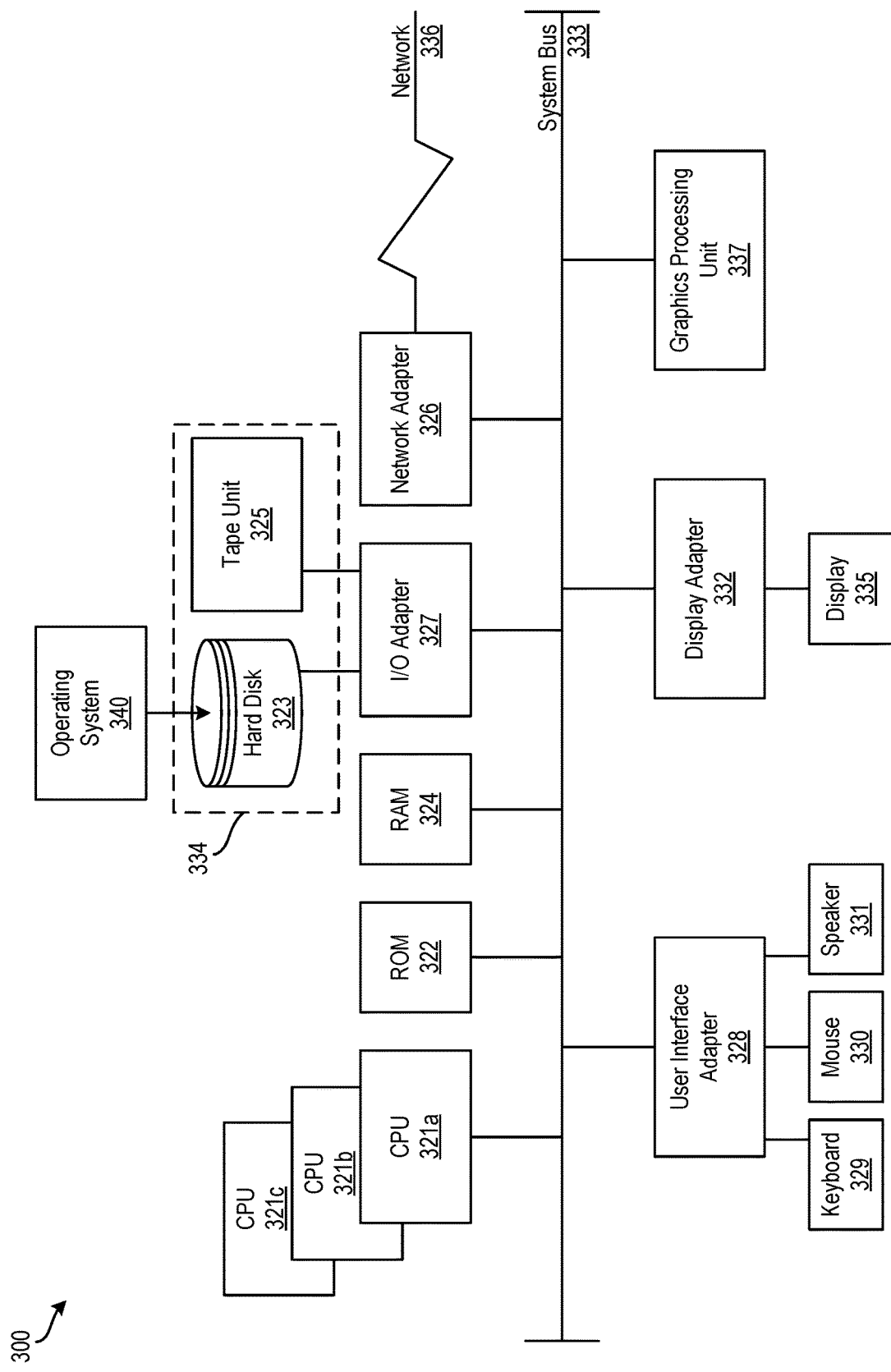
FIG. 3 depicts a block diagram of a processing system for implementing the presently described techniques according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321$a$, 321$b$, 321$c$, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super 110 chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, the technical solutions described herein create a temporary network in response to detecting a trigger event to enable access to a physical space and initiate a suitable automation routine in response to the trigger event. The described technical solutions improve existing "smart home" technologies by utilizing smart-enabled devices within a physical space to grant access to the physical space during emergencies and enable automation routines to be executed when emergencies are detected.

Turning now to an overview of the aspects of the invention, one or more embodiments of the invention address the above-described shortcomings of the prior art by providing access to a physical space during an emergency by creating a temporary network and associated temporary authorization code and transmitting this information to emergency services. When an emergency responder arrives at the physical space, the emergency responder can connect to the temporary network to access the physical space. For example, when the emergency responder connects to the temporary network, an "arrival" automation routine can be initiated to unlock smart locks to allow physical access to the physical space. Once the emergency has ended, a "departure" automation routine can be initiated to secure the physical space, and the temporary network can be terminated. This enables emergency personnel to access a physical space. Moreover, automation routines can be implemented to mitigate damage during times of emergency. For example, an appliance causing a fire can be shut off, lights can be turned on during a home invasion to cause an invader to flee, and the like.

The above-described aspects of the invention address the shortcomings of the prior art by providing access to a physical space in a secure and verifiable way. Emergency responders receive access to a temporary network created upon the detection of a trigger event. The emergency responders then access the temporary network to receive access to the physical space.

Figure 4:
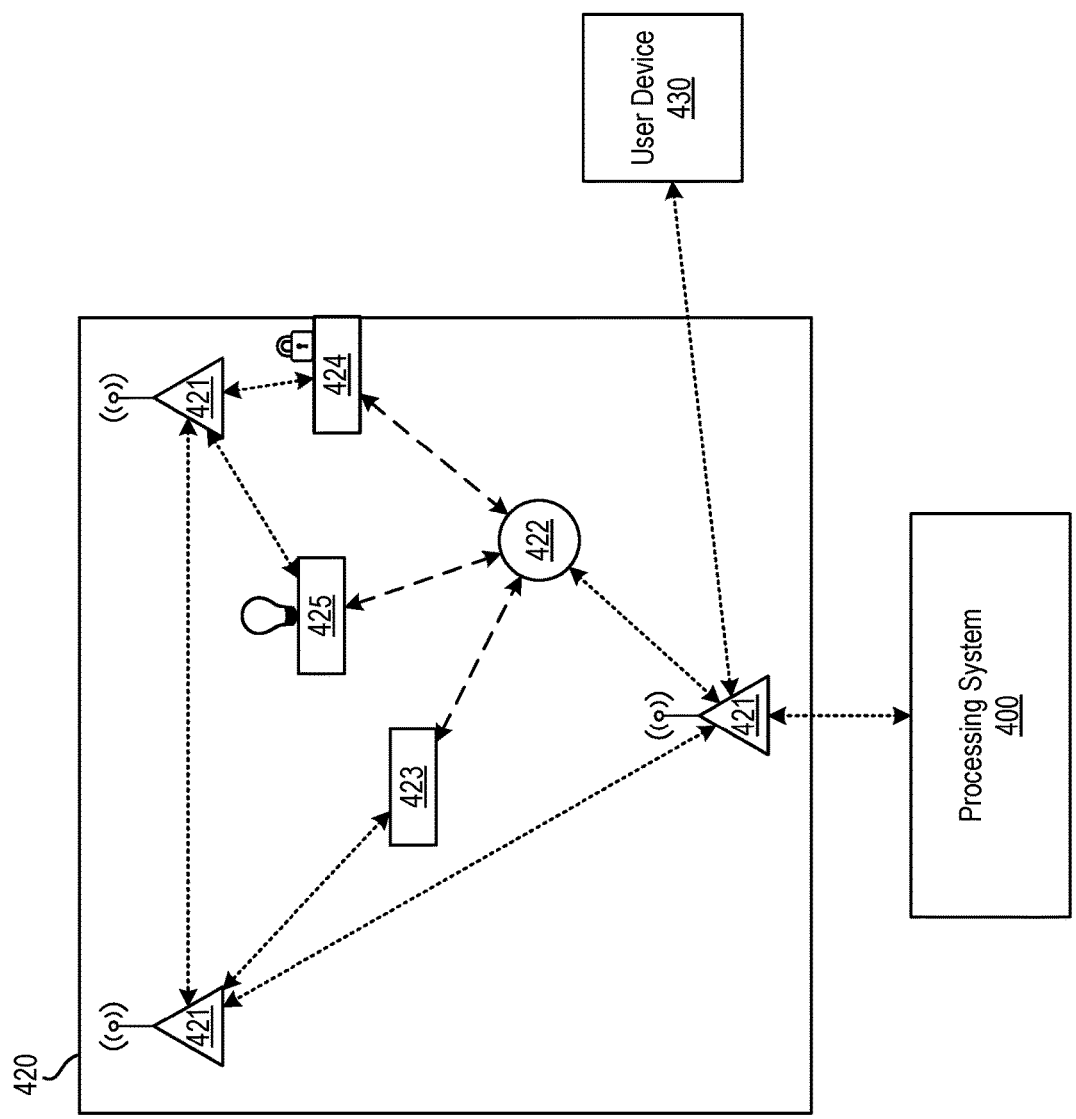
FIG. 4 depicts a block diagram of an environment for authenticating access to a physical space using a processing system according to one or more embodiments described herein.

Turning now to a more detailed description of aspects of the present invention, FIG. 4 depicts a block diagram of an environment for authenticating access to a physical space 420 using a processing system 400 according to one or more embodiments described herein.

The physical space 420 can be a residential space, commercial space, and the like. The physical space 420 includes access points 421, which can be wired and/or wireless access points that provide networking capabilities within and around the physical space 420. For example, the access points 421 are WiFi access points that provide wireless communication to various smart devices, such as a smart hub 422, a smart device 423, a smart lock 424, a smart lock 424, and the like. The smart hub 422 can be any suitable device that provides a human-machine interface (HMI) to enable a user to interact with the smart hub 422 and other devices communicatively couplable to the smart hub 422, such as the smart device 423, the smart lock 424, the smart lock 424, etc. Each of the smart hub 422, the smart device 423, the smart lock 424, the smart lock 424 can connect to one another via a network (not shown) formed by the access points 421. Similarly, the processing system 400 and other devices, such as a user device 430, can also connect to the network. This enables each of the devices shown in FIG. 4 to communicate with one another.

According to one or more embodiments described herein, the processing system 400 provides access control to the physical space 420 when a trigger event occurs. The trigger event can be an emergency call originating at the physical space 420 or can be another trigger event, such as a calendar event, phone call to a service provider, etc.). When an emergency call is placed at the physical space 420, one or more of the smart devices (e.g., the smart hub 422, the smart device 423, the smart lock 424, the smart lock 424) listens to the emergency call and analyzes it to detect keywords and/or phrases. The processing system 400, upon the occurrence of the trigger event, creates a temporary network and associated temporary authorization code to permit access to the physical space 420 based on the analysis of the information associated with the trigger event. The information about the temporary network and the temporary authorization code is transmitted to a third-party, such as an emergency service provider. The third-party can use the user device 430 to connect to the temporary network using the temporary authorization code to obtain access to the physical space 420. For example, the user device 430 can be used by a police officer to open the smart lock 424 when the police officer arrives at the physical space 420. The processing system 400 can also implement automation routines for smart devices.

Figure 5:
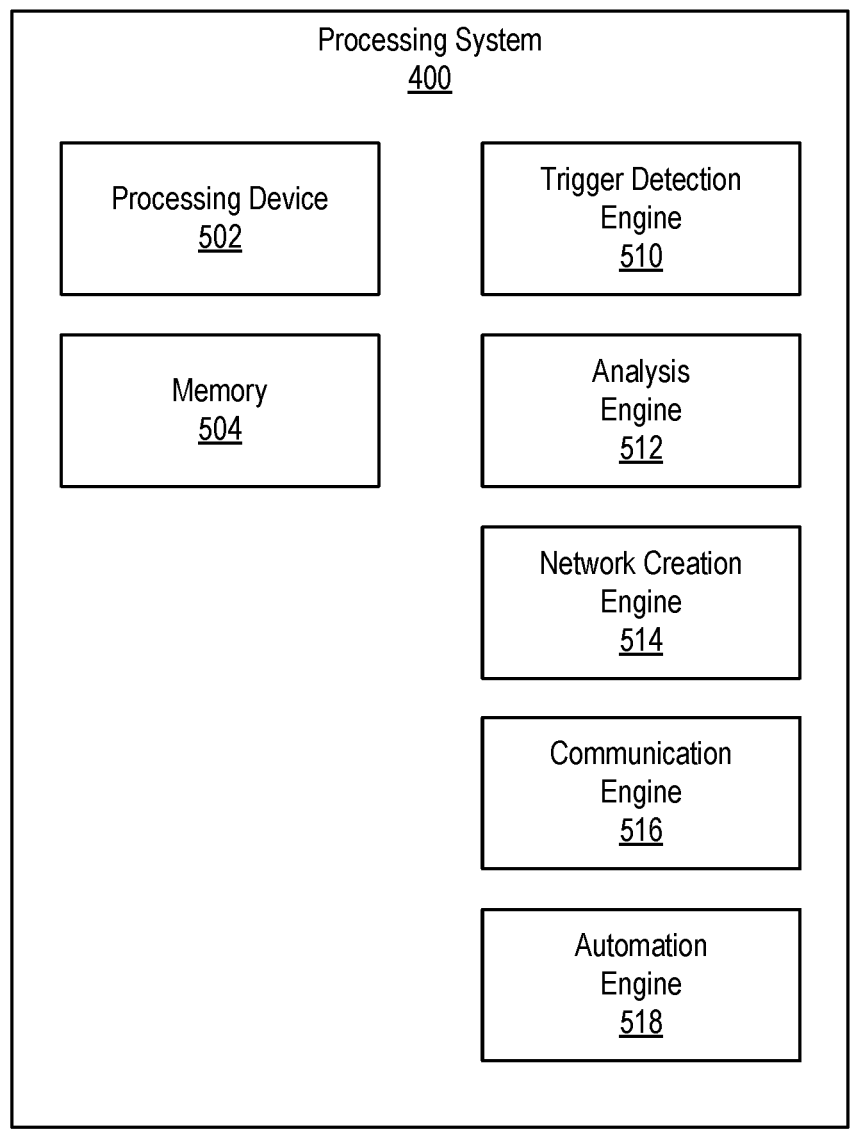
FIG. 5 depicts a block diagram of the processing system of FIG. 4 for authenticating access to a physical space according to one or more embodiments described herein.

FIG. 5 depicts a block diagram of the processing system 400 of FIG. 4 for authenticating access to a physical space according to one or more embodiments described herein. The processing system 400 includes a processing device 502, a memory 504, a trigger detection engine 510, an analysis engine 512, a network creation engine 514, a communication engine 516, and an automation engine 518.

The various components, modules, engines, etc. described regarding FIG. 5 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 502 for executing those instructions. Thus a system memory (e.g., the memory 504) can store program instructions that when executed by the processing device 502 implement the engines described herein. Other engines can also be utilized to include other features and functionality described in other examples herein.

Figure 6:
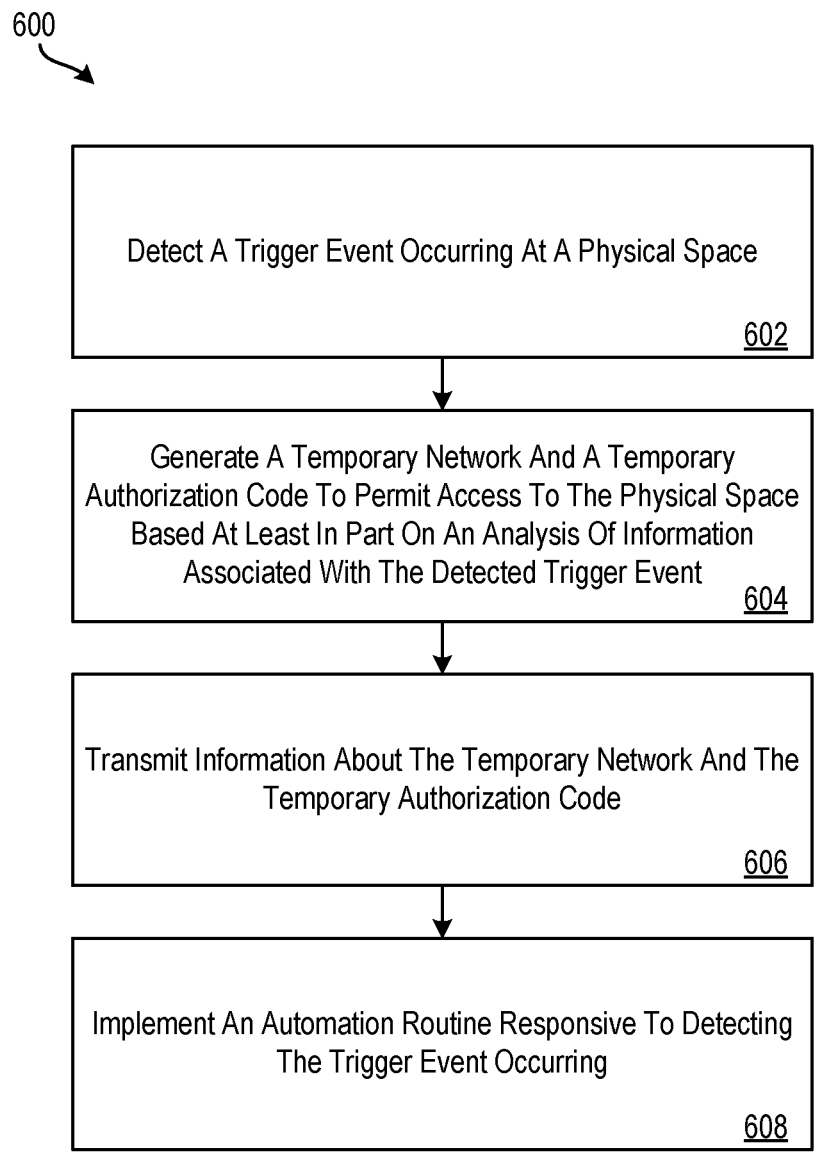
FIG. 6 depicts a flow diagram of a method for authenticating access to a physical space according to one or more embodiments described herein.

The features and functionality of the processing system 400 (including the trigger detection engine 510, the analysis engine 512, the network creation engine 514, the communication engine 516, and the automation engine 518) are now described with reference to FIG. 6. In particular, FIG. 6 depicts a flow diagram of a method 600 for authenticating access to a physical space according to one or more embodiments described herein. The method 600 can be performed or implemented using any suitable processing system (e.g., the cloud computing environment 50, the processing system 300, the processing system 400, etc.) and/or any suitable processing device (e.g., the processing device 321, the processing device 502, etc.).

At block 602, the trigger detection engine 510 detects a trigger event occurring at a location associated with the physical space 420. The trigger event can be, for example, an emergency call. For example, when an emergency (e.g., a fire, break-in, medical event, etc.) occurs, a caller may call 911 or another emergency service. The smart hub 422 detects this call as a trigger event at block 602. According to one or more embodiments described herein, the smart hub 422 is equipped with a microphone and can "listen" to sounds within the range of the microphone. If the smart hub 422 detects speaking via the microphone, the analysis engine 512 analyzes the detected speaking to determine whether a person speaking is making a 911 or other emergency call (e.g., a call to the police department, fire department, etc.) or whether the call is a non-emergency call. The analysis engine 512 can include speech-to-text capabilities to convert the speech to text and can analyze the text to identify keywords and phrases in the conversation, such as "emergency," "fire," "intruder," "I need medical help" and the like. In some examples, the analysis is offloaded, such as to the cloud computing environment 50 or another suitable device/system for determining whether the detected sounds indicate that an emergency call (or other trigger event) is occurring.

At block 604, the network creation engine 514 creates a temporary network and a temporary authorization code for the temporary network. The new network can be a new service set identifier (SSID) that can be broadcast via the access points 421 within and around the physical space 420. The network creation engine 514 can interface with a network device/appliance, such as a router, a modem, one or more of the access points 421, etc., to create the temporary network. The temporary network can be in addition to, or instead of, an existing network. For example, if a network exists with an SSID of "home_wifi," a new network can be generated with an SSID of "E911" and the two networks can co-exist. In some examples, the existing "home_wifi" network is terminated and a new temporary network is created with a different SSID; in some examples, the existing "home_wifi" network is renamed with a temporary SSID. The network creation engine 514 also creates a temporary authorization code (e.g., a password, passcode, PIN, etc.) to enable the user device 430 (e.g., a tablet computer, a smartphone, a laptop, etc.) to access the temporary network.

At block 606, the communication engine 516 transmits information about the newly generated temporary network to a third-party, such as an emergency services provider. For example, the communication engine 516 transmits the newly created SSID (e.g., "E911") and an associated temporary passcode (e.g., "5744"). The communication engine 516 can utilize any suitable wired and/or wireless communication interface and protocol, such as cellular, radio frequency, WiFi, Ethernet, and the like. Once received, the third-party (e.g., the emergency services provider) uses the information about the temporary network and the temporary authorization code to access the temporary network. According to one or more embodiments described herein, the communication engine 516 sends a message to an emergency services provider, which states: "This is n automated message from 123 Main Street, Anytown, regarding the emergency call that is currently in progress. If emergency services are required to enter the property, they will need this network and passcode: SSID=E911 and passcode=5744." Other similar messages can be sent and can be communicated by phone call, text message, email, etc.

At block 608, the automation engine 518 implements an automation routine responsive to detecting the trigger event. The automation routine can include various sub-routines, which can be determined, for example, based on the trigger event. For example, the smart hub 422 can monitor an emergency call and perform analysis (using, for example, the analysis engine 512) to determine what type of emergency is being reported. Using this information, the automation engine 518 can implement an automation routine (and/or one or more subroutines) selected from a group of automation routines and subroutines based on information about the trigger event. For example, if the word "fire" is detected during the emergency call, the analysis engine 512 determines that a fire is present at the physical space 420. The automation engine 518 then implements a "fire" automation subroutine. In an example, the "fire" subroutine causes door locks (e.g., the smart lock 424) to change to open/unlocked states, lights (e.g., the smart light 425) are turned on, air handling/HVAC systems are turned off, appliances are turned off, and the like.

Additional processes also may be included. For example, the processing system 400 can control a smart device based at least in part on the information associated with the detected trigger event. For example, where the smart device is a smart lock, controlling the smart lock includes causing the smart lock to become unlocked when a user device connects to the temporary network using the temporary authorization code. This represents an improvement to existing smart locks, for example, by causing the smart lock to be enabled/disabled when a device connects to a temporary network using the temporary authorization code. A user need not have a passcode for the smart lock itself; merely connecting to the temporary network can cause the smart lock to be active/deactivated.

It should be understood that the process depicted in FIG. 6 represents an illustration and that other processes may be added or existing processes may be removed, modified, or rearranged without departing from the scope and spirit of the present disclosure.

Figure 7:
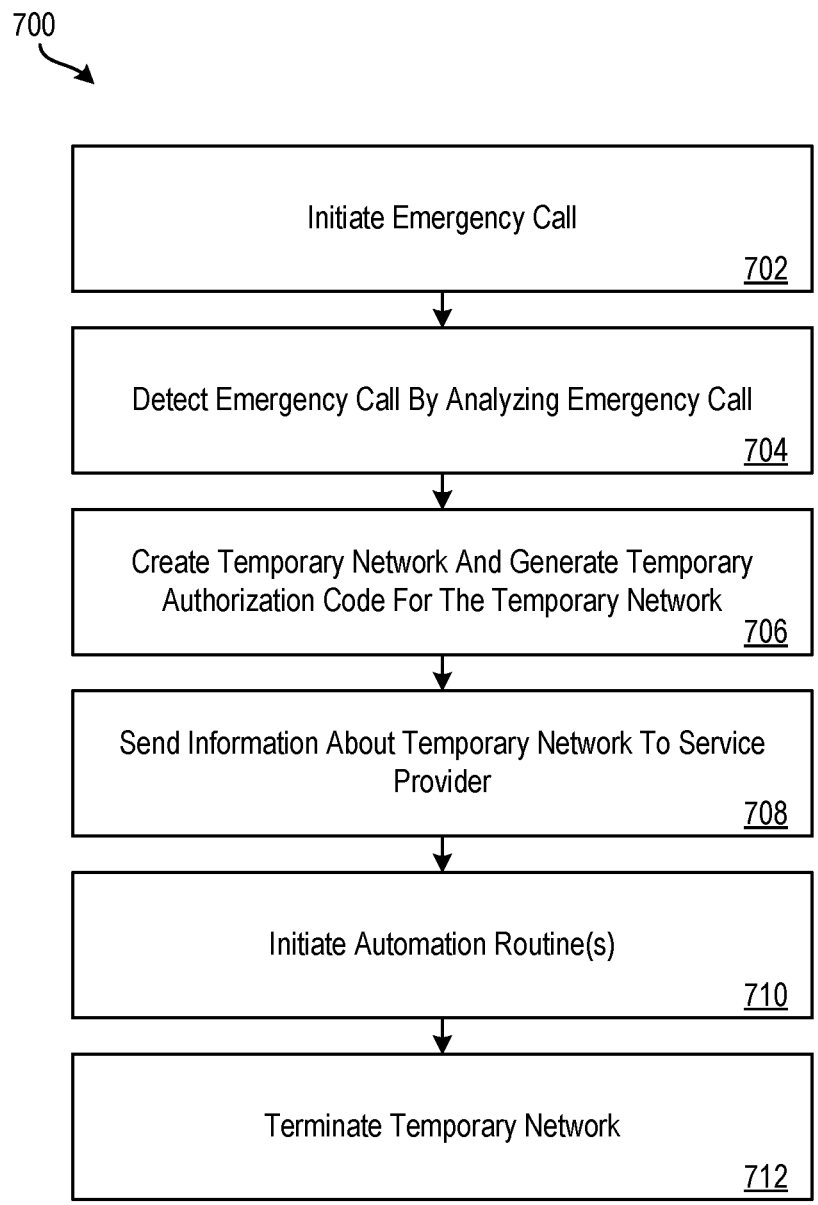
FIG. 7 depicts a flow diagram of a method for authenticating access to a physical space according to one or more embodiments described herein.

FIG. 7 depicts a flow diagram of a method 700 for authenticating access to a physical space according to one or more embodiments described herein. The method 700 can be performed or implemented using any suitable processing system (e.g., the cloud computing environment 50, the processing system 300, the processing system 400, etc.) and/or any suitable processing device (e.g., the processing device 321, the processing device 502, etc.).

At block 702, when an emergency (e.g., a fire, break-in, medical event, etc.) occurs, a caller may call 911 or another emergency service. The smart hub 422 detects this call as a trigger event at block 704. According to one or more embodiments described herein, the smart hub 422 is equipped with a microphone and can "listen" to sounds within range of the microphone. If the smart hub 422 detects speaking via the microphone, the smart hub 422 and/or the analysis engine 512 analyzes the detected speaking to determine whether a person speaking is making a 911 or other emergency call (e.g., a call to the police department, fire department, etc.) or whether the call is a non-emergency call. The smart hub 422 can be equipped with, or can access, speech-to-text capabilities to convert the speech to text and can analyze, using natural language processing capabilities, the text to identify keywords and phrases in the conversation, such as "emergency," "fire," "intruder," "I need medical help" and the like. In some examples, the analysis is offloaded, such as to the cloud computing environment 50, the processing system 400, or another suitable device/ system for determining whether the detected sounds indicate that an emergency call (or other trigger event) is occurring.

At block 706, a temporary network is created, and a temporary authorization code for the temporary network is generated. For example, the processing system 400 can cause a new network to be created. The new network can be a new service set identifier (SSID) that can be broadcast via the access points 421 within and around the physical space 420.

Once the temporary network and associated temporary authorization code are created, the information about the temporary network (e.g., the SSID of the network, the temporary authorization code for the temporary network, etc.) is sent to an emergency services provider at block 708. The emergency services provider can include police, fire, first responders, a 911 dispatcher or call center, or another suitable source to provide emergency services or that is in contact with emergency services. For example, the information about the temporary network is sent by the processing system 400 to a 911 dispatch center, which then relays the information about the temporary network to appropriate responders (e.g., a police officer, a fireman, an emergency medical technician, etc.). For example purposes, the temporary network can have SSID of "E911" or another suitable name, and the passcode to access the temporary network can be "1234" or another suitable passcode. It should be appreciated that the SSID and passcode are merely examples and other SSIDs and/or passcodes can be used without departing from the spirit of the techniques described herein. The temporary network can coexist along with preexisting networks. This enables the preexisting networks to continue to provide networking capabilities and connectivity.

When a responder (e.g., a police officer, a fireman, etc.) arrives at the physical space 420, the responder can use the user device 430 to connect to the temporary network using the temporary authorization code. Once connected, the responder can interact with the various smart devices (e.g., the smart hub 422, the smart device 423, the smart lock 424, the smart lock 424, etc.). For example, the responder can cause the smart lock 424 to change to an open/unlocked state (or a closed/locked state), can cause the smart light 425 to turn off (or on), etc. In some examples, the smart lock 424 automatically changes to an open/unlocked state when the user device 430 connects to the temporary network using the temporary authorization code.

At block 710, an automation routine is initiated. According to one or more embodiments described herein, the automation routine can be selected from a group of automation routines based on information about the trigger event (e.g., keywords contained in an emergency call). The automation routine can also include subroutines. In one example, an automation routine includes an "initial" subroutine, an "arrival" subroutine, and a "departure" subroutine.

The initial routine is executed upon creation of the temporary network and can be based on a detected keyword. For example, in the case of a fire automation routine (determined when the word "fire" is detected for example), the initial subroutine turns on all smart lights, turns off smart appliances, turns off a main gas meter, and the like. In another example, in the case of a home intrusion (determined when the word "intruder" is detected for example), the initial subroutine turns on smart lights, locks all smart locks, causes security cameras to begin recording, arms a security system, etc.

The arrival subroutine is executed when a responder (e.g., a fireman) connects, via the user device 430, to the temporary networking using the temporary authorization code for the temporary network. In the case of a fire, the arrival subroutine can unlock all smart locks, for example, to permit access to the physical space 420. In the case of a home intruder, the arrival subroutine can disarm a security system and unlock a smart lock.

The departure subroutine is executed when all responders are determined to have left the physical space 420. For example, smart devices within the physical space 420 can determine how many responders were in the physical space and can initiate the departure subroutine once all of the responders have departed (or a predetermined time period after all of the responders have departed). For example, if one person used a device (e.g., the user device 430) to connect to the temporary network, but the smart devices detected that nine different people were in the physical space (e.g., nine firemen came to attend to the fire), then the departure subroutine is executed once it is determined that all nine firemen have departed. This can be determined using sensors in the smart devices, for example. The departure subroutine can lock the smart locks, turn off the smart lights, arm a security system, etc. In the case of a home intruder, the departure subroutine can re-arm the security system and lock all smart locks.

At block 712, the temporary network is terminated. For example, the temporary network's SSID is deleted, inactivated, or changed. In another example, the temporary authorization code is deleted, inactivated, or change, or the like. The termination can occur manually or automatically. For example, the "departure" routine can be a trigger event that causes the temporary network to be terminated.

Additional processes also may be included, and it should be understood that the process depicted in FIG. 7 represents an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   detecting a trigger event occurring at a physical space;
   generating, by a processing system, a temporary network and a temporary authorization code to permit access to the physical space based at least in part on an analysis of information associated with the detected trigger event;
   transmitting, by the processing system, information about the temporary network and the temporary authorization code to a second processing system;
   implementing, by the processing system, an automation routine responsive to detecting the trigger event; and
   terminating the temporary network and the temporary authorization code subsequent to a second trigger event occurring,
   wherein the trigger event is an emergency call, wherein the information associated with the detected trigger event is determined by performing a natural language processing (NLP) analysis on the emergency call during the emergency call, wherein performing the NLP analysis comprises identifying a keyword, and wherein the automation routine is selected from a plurality of routines based at least in part on the keyword.

2. The computer-implemented method of claim 1, wherein implementing the automation routine occurs subsequent to generating the temporary network and the temporary authorization code and subsequent to transmitting the temporary authorization code.

3. The computer-implemented method of claim 1, wherein generating the temporary network comprises generating a temporary service set identifier.

4. The computer-implemented method of claim 1, wherein the automation routine comprises an initial subroutine, an arrival subroutine, and a departure subroutine.

5. The computer-implemented method of claim 1, wherein the automation routine is selected from a plurality of routines based at least in part on the information associated with the detected trigger event.

6. The computer-implemented method of claim 1, wherein the automation routine is a fire routine, the fire routine causing an appliance to be turned off.

7. The computer-implemented method of claim 1, wherein the automation routine is an invasion routine, the invasion routine causing a lock to be locked and a light to be turned on.

8. The computer-implemented method of claim 1, further comprising controlling a smart device based at least in part on the information associated with the detected trigger event.

9. The computer-implemented method of claim 8, wherein the smart device is a smart lock, and wherein controlling the smart lock comprises causing the smart lock to become unlocked when a user device connects to the temporary network using the temporary authorization code.

10. A system comprising:
a memory comprising computer readable instructions; and
a processing device for executing the computer readable instructions for performing a method comprising:
detecting a trigger event occurring at a physical space;
generating, by the processing system, a temporary network and a temporary authorization code to permit access to the physical space based at least in part on an analysis of information associated with the detected trigger event;
transmitting, by the processing system, information about the temporary network and the temporary authorization code to a second processing system;
implementing, by the processing system, an automation routine responsive to detecting the trigger event; and
terminating the temporary network and the temporary authorization code subsequent to a second trigger event occurring,
wherein the trigger event is an emergency call, wherein the information associated with the detected trigger event is determined by performing a natural language processing (NLP) analysis on the emergency call during the emergency call, wherein performing the NLP analysis comprises identifying a keyword, and wherein the automation routine is selected from a plurality of routines based at least in part on the keyword.

11. The system of claim 10, wherein implementing the automation routine occurs subsequent to generating the temporary network and the temporary authorization code and subsequent to transmitting the temporary authorization code.

12. The system of claim 10, wherein generating the temporary network comprises generating a temporary service set identifier.

13. The system of claim 10, wherein the automation routine comprises an initial subroutine, an arrival subroutine, and a departure subroutine.

14. The system of claim 10, wherein the automation routine is selected from a plurality of routines based at least in part on the information associated with the detected trigger event.

15. A computer program product comprising:
a non-transitory computer readable storage medium having program instructions embodied therewith, the program instructions executable by a processing device to cause the processing device to perform a method comprising:
detecting a trigger event occurring at a physical space;
generating, by the processing system, a temporary network and a temporary authorization code to permit access to the physical space based at least in part on an analysis of information associated with the detected trigger event;
transmitting, by the processing system, information about the temporary network and the temporary authorization code to a second processing system;
implementing, by the processing system, an automation routine responsive to detecting the trigger event; and
terminating the temporary network and the temporary authorization code subsequent to a second trigger event occurring,
wherein the trigger event is an emergency call, wherein the information associated with the detected trigger event is determined by performing a natural language processing (NLP) analysis on the emergency call during the emergency call, wherein performing the NLP analysis comprises identifying a keyword, and wherein the automation routine is selected from a plurality of routines based at least in part on the keyword.

* * * * *